Patented June 25, 1935

2,006,229

UNITED STATES PATENT OFFICE 2,006,229

ART OF COATING PAPER

Charles N. Cone and Earl D. Brown, Seattle, Wash., assignors, by mesne assignments, to The Glidden Company, Cleveland, Ohio, a corporation of Ohio No Drawing. Application March 5, 1930, Serial No. 433,520

3 Claims. (Cl. 91—68)

In the art of paper coating as customarily practiced, casein is employed as the base most generally, notwithstanding its drawbacks in the matter of tending to foam in making up, and the necessity of special precautions where certain mineral agents are admixed. Efforts have been made to apply animal glue for this usage, and also starch, but neither of these have properties adapting them to such a usage in a degree comparable to casein. Animal glue does not give a water resistant coating unless subsequently specially treated, and it has the further very particular drawback of requiring very careful temperature control, with application of heat to maintain its viscosity sufficiently low to allow brushing. This necessitates special equipment in the applicator devices. Starch although having the property of yielding a good color and great resistance to bacterial decomposition, does not produce a water resistant coating, and the finish is not always what is desired. In accordance with the present invention, however, we are enabled to coat paper in a manner avoiding special and unusual equipment and yielding a coating of excellent finish and with water resistance without special treatment, while at the same time in the make-up and in the application of the material there is avoidance of detrimental foaming tendency and settling out of the mineral bodying agent.

To the accomplishment of the foregoing and related ends, the invention, then, consists of the features hereinafter fully described, and particularly pointed out in the claims, the following description setting forth in detail certain illustrative embodiments of the invention, such being indicative however of but a few of the various ways in which the principle of the invention may be employed. For paper-coating purposes, it is highly desirable that protein employed should not be resistant against dispersion, but on the other hand should be readily dispersible in even weakly alkaline salt solutions.

As a base for our improved coating, we treat oleaginous seeds, as for instance soya bean, cottonseed, peanut, castor, etc., to derive the protein. Where a seed material retains coloring matter in its shell or membranous cover, this unless to be applied to a usage where color is not objectionable, should be eliminated by decortication of the seeds. With the readily obtainable varieties of soya bean, however, no difficulty from coloring matter is encountered. Desirably the oil is preliminarily extracted from the seeds, and the pressed cake as left from commercial oil-removal processes is accordingly an advantageous starting material for the present process.

With such a seed material, preferably the pressed cake, further treatment is favored by disintegration, and the cake may be ground to convenient mesh, for example about 80 mesh flour or meal. The flour or meal is then treated with an aqueous menstruum, for instance about 100 parts of the ground cake with about 2000 parts of water containing an alkaline agent. If the alkaline agent be caustic soda, all of the protein in the seed cake will be dissolved out. Insoluble matter may be eliminated by any suitable means, as by settling or centrifuging. If to the clarified liquor lime be added, a flocculent precipitate will be formed containing about 10% of the protein in the liquor. If instead of caustic soda, lime be employed in the original digestion, all but about 10-20% of the protein will be brought into solution, an amount corresponding generally to that above noted. If on the other hand, a weakly alkaline salt, as for instance sodium sulfite, be employed as the alkaline agent, the protein is dissolved out except for about 10% as before, but in this case such residual protein is not made so particularly insoluble by the lime as in the foregoing case, and it consequently may be more readily recovered by extraction with caustic soda, and may be used as a lower grade sizing material or for other purposes as desired. Extraction may be carried out cold or hot, preferably hot, temperatures as high as 120° F. being desirable with some reagents. We generally prefer to employ a weakly alkaline salt, as sodium sulfite, sodium phosphate, etc., as for example: 100 parts of the flour or meal is mixed with about 2000 parts of water and about 3 parts of sodium sulfite. This is kept agitated for two or three hours and it is then centrifuged, the liquor containing the dissolved protein thus being separated from the sludge containing undissolved protein and other matters. The liquor is heated to the desired temperature and about 10 parts of lime is added, a flocculent precipitate is formed and is separated, as by centrifuging. The liquor is then held at a suitable temperature for a sufficient length of time and a denaturing of the protein occurs, making it dispersible. About 16 hours at about 60° F. or two hours at 120° F. produces a satisfactory result. In general, the factors of temperature, time and alkaline strength are somewhat interchangeable, higher temperature shortening the time as do higher concentrations of alkaline agent. The protein is precipitated by suitable means, for instance by lowering the pH. Excellent adhesive qualities are obtained if the precipitation is carried out at about pH 4.0. The precipitated protein handles best if at or near pH 4.4. The control of the hydrogen ion concentration may be conveniently had by the addition of an acid, for instance sulphuric acid. The handling properties of the protein are improved if the precipitation is carried out at a relatively high temperature, say 120° F. The clear liquor is separated off and the curd is drained and pressed to about 65% moisture content (actual basis). The pressed curd can then be disintegrated by suitable grinding, and may be directly made up for coating. If not to be immediately used, it can be dried at a low temperature, for instance 90°, or 100° F., and be held in stock until ready to make up for coating.

Where employing lime as the initial alkaline agent, we proceed for example as follows: About 100 parts of flour are mixed with about 2000 parts of water. Hydrated lime calculated to 10% of the flour basis is added, with agitation. The mixture is allowed to stand over night, and insoluble matter is separated. The liquor is heated, for instance to 120° F., and the protein is precipitated as before, and may be washed and be made up for coating, or be dried for subsequent use, as desired.

A lime-soluble protein as obtained in accordance with our process, or a protein obtained by subjecting oleaginous seed material to treatment with lime water is found to make possible important new results. While other proteinous materials after drying are resistant against dispersion even with caustic alkalies, our protein is re-dispersible in solutions of weakly alkaline salts.

The protein is now made up with a solution of salts, the wet protein as derived, or the dry protein as the case may be, and conveniently it may be incorporated in part of the water to be employed, and the salts may be dissolved in the other portion of the water and then the whole be mixed together and heated for about an hour, at a temperature for instance of 120°–150° F. About 4 or 5 parts of water to one part of the protein (calculated to dry basis) is employed. Sodium carbonate, borax, trisodium phosphate, in some instances ammonia, etc., are desirable as the salts suitable for dispersing and conditioning. We also prefer to add sodium bisulfite. For instance, to 100 parts of protein, 3 parts of sodium carbonate, 8 of trisodium phosphate, 4 parts of borax, and 2 parts of sodium bisulfite all by weight, may be used. After mixing and heating for about an hour the mineral bodying agent is admixed. This may be clay and satin white or the like. For instance, 75 parts of the dry clay and 25 parts of satin white may be made up in a thick slurry with water, and this be stirred into the protein mixture in proportions for instance of about 16 parts of the protein to 84 parts of the mineral, both calculated on dry basis. For large proportions of satin white, more protein is used, thus about 22 parts of the protein is desirable to about 78 parts of the satin white for instance.

One very striking advantage of our process is apparent at this point. Whereas with casein, the addition of such a material as satin white, which contains lime, gels the casein and occasions considerable trouble, particularly if the temperature is elevated, with our process satin white and lime containing agents make no trouble. In fact, we can use hydrated lime direct, admixing it with the prepared protein. This is impossible with such an agent as casein. Furthermore, by employing hydrated lime with the protein preparation, for the coating application, we obtain a water-resistant coating directly. This is a feature not heretofore available in this art.

The protein mixture is applied to the paper by any suitable applicator machinery, as desired, and the product as calendered and dried is found to have an excellent finish, and a water-resistant such as not heretofore possible in direct coating application.

Whereas, in the prior practice, difficulties from foaming and from premature settling of the mineral constitutents have been a concomitant, it will thus be seen that the present invention obviates foaming-trouble in the making up and applying, and a better holding up of the mineral bodying material is had, while at the same time it becomes possible to employ lime and directly obtain a water-resistant product, and paper thus coated, furthermore takes ink well, being particularly well adapted to the current type of ink.

Other modes of applying the principle of the invention may be employed, change being made as regards the details described, provided the features stated in any of the following claims, or the equivalent of such, be employed.

We therefore particularly point out and distinctly claim as our invention:—

1. The process of making non-sticking coated paper, which comprises extracting a vegetable protein from seed material, digesting such protein several hours at raised temperature in a weakly alkaline solution to a form soluble in lime water even after being dried out, dissolving the protein in a weakly alkaline solution and incorporating with the solution a larger amount of a finely divided lime-containing filler than the protein to form a slurry, applying such slurry of lime-containing material and changed vegetable protein to the paper, and drying, whereby a water-resistant non-sticking paper sheet is attained.

2. The process of making non-sticking coated paper, which comprises extracting a vegetable protein from seed material, digesting such protein several hours at raised temperature in a weakly alkaline solution to a form soluble in lime water even after being dried out, dissolving about 1 part of the protein in 4–5 parts of a weakly alkaline solution at a temperature of 120–150° F., then stirring in a finely divided lime-containing filler to form a slurry, applying such slurry to the paper, and drying, whereby a water-resistant non-sticking paper sheet is attained.

3. The process of making non-sticking coated paper, which comprises extracting a vegetable protein from seed material, digesting such protein several hours at raised temperature in a weakly alkaline solution to a form soluble in lime water even after being dried out, dissolving about 1 part of the protein in 4–5 parts of a weakly alkaline solution, while heating for about an hour at a temperature of 120–150° F., then stirring in a finely divided lime-containing filler to form a slurry, applying such slurry to the paper, and drying, whereby a water-resistant non-sticking paper sheet is attained.

CHARLES N. CONE.
EARL D. BROWN.